United States Patent [19]

Amory et al.

[11] Patent Number: 4,681,527

[45] Date of Patent: Jul. 21, 1987

[54] APPARATUS FOR THE INJECTION MOULDING OF DISC RECORDS

[75] Inventors: Henri Amory, Chambourcy; Jean-Michel Prost, Orgeval, both of France

[73] Assignee: Pathe Marconi EMI SA, Boulogne Billancourt, France

[21] Appl. No.: 730,514

[22] Filed: May 6, 1985

[30] Foreign Application Priority Data

May 4, 1984 [FR] France .................... 84 06930

[51] Int. Cl.⁴ .................................. B29C 45/34
[52] U.S. Cl. .................... 425/546; 249/141; 264/107; 425/554; 425/810; 425/812
[58] Field of Search ............ 264/104, 105, 106, 107; 425/810, 812, 140, 546, 554, , 556; 249/141

[56] References Cited

U.S. PATENT DOCUMENTS

| 4,085,178 | 4/1978 | McNeely et al. | 425/810 |
| 4,374,636 | 2/1983 | Holmes | 425/589 |
| 4,431,047 | 2/1984 | Takeshima et al. | 425/812 |

FOREIGN PATENT DOCUMENTS 1507289 12/1967 France .
1205623 9/1970 United Kingdom .
1209155 10/1970 United Kingdom .

Primary Examiner—Jay H. Woo
Assistant Examiner—Timothy W. Heitbrink
Attorney, Agent, or Firm—Fleit, Jacobson, Cohn & Price

[57] ABSTRACT

Two matrices, each bearing modulation to form a microgroove disc record, are fixed to half-moulds by means of sleeves, having first and second fixing flanges which extend into the gap between the matrices. One of the flanges is an annular blade whose inner radial surface defines the edge of a moulded disc and whose thickness is slightly less than that of the moulded disc. Formed integrally with, or attached to, the blade is a group of radially outwardly extending lugs which are attached to the body of its associated sleeve. The other flange comprises a second group of lugs mounted to the body of its associated sleeve radially outward of the blade such that the second group of lugs may lie in the spaces between the first mentioned group of lugs. The thickness of the lugs of the second group determines the thickness of the disc and the thickness of the lugs of the first and second groups differs, to determine a gap for escape of air along the first flange. Spaces between the groups of the two interlaced lugs permit a controlled escape of air from the periphery of the record without the formation of peripheral flash.

10 Claims, 9 Drawing Figures

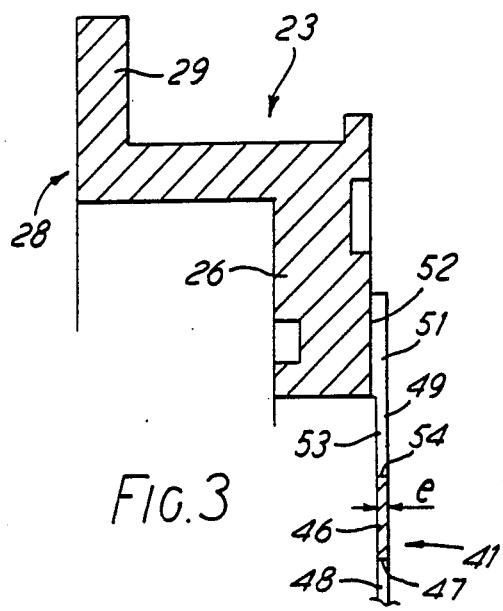
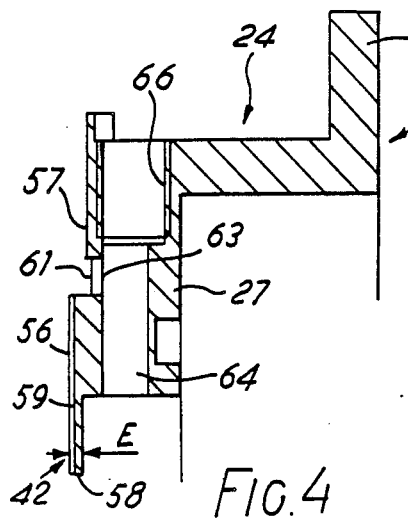
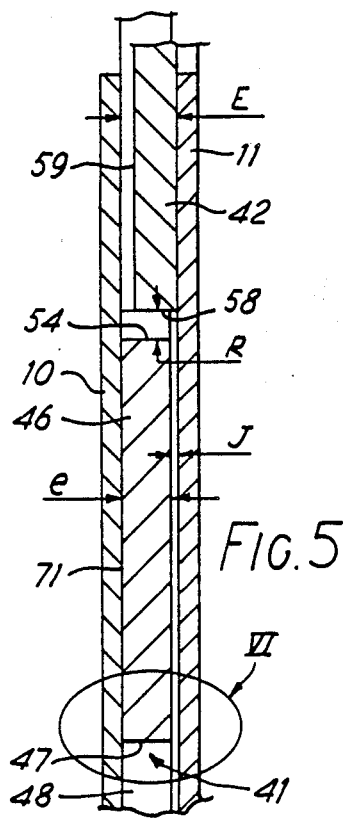
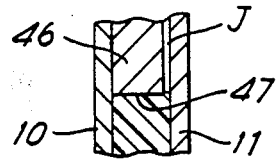

APPARATUS FOR THE INJECTION MOULDING OF DISC RECORDS

The present invention relates to apparatus for the injection moulding of disc records and is particularly, but not exclusively, suitable for the injection moulding of microgroove discs for sound recording.

Apparatus for the injection of microgroove disc records generally includes two half-moulds to each of which a nickel matrix bearing the negative form of the microgroove modulation to be moulded is fixed by means of a peripheral sleeve. Each matrix has hitherto been provided with an annular recess surrounding the moulding space, the recesses facing one another to define a set annular clearance of approximately 0.03 mm. The outer annulus surrounding the recess in each matrix has been conically dished to provide divergent conical surfaces which are supported by the sleeves under moderate pressure, thereby permitting movement of thermal origin. The two sleeves have additionally been gripped one against the other between the half-moulds and outside the periphery of the matrices in order to control at the same time both the aforementioned clearance and the thickness of the disc to be produced. Typically one of the half moulds has, in a central position, an injector for plastics, the other half-mould having an ejector for the finished disc. When plastics material is injected it drives out the air via the aforementioned set clearance and via passages contrived in the sleeves. The injection is timed to stop as soon as the plastic reaches the set clearance.

The above apparatus has several drawbacks. Several pairs of sleeves of different thickness are needed in order to control the width of the annular clearance in view of the manufacturing tolerances on the matrices. Such control may still be inadequate, however, in view of variations in thickness around the matrix. Moreover, the matrices deform elastically during moulding and even a clearance which was initially properly set may vary in course of operation. If the clearance is too small the air is not driven out efficiently, and there is then a risk that the grooves of the disc are incompletely moulded and the recording is of poor quality, while the disc exhibits marks corresponding to areas where air has been trapped. If the gap is too great there forms at the edge of the disc a thick flash which is difficult to remove. Even when the gap is correctly set during moulding the discs produced have a slight peripheral flash which is not aesthetically pleasing and may cut the sleeves in which the discs are to be packed.

The object of the present invention is to provide apparatus for the injection moulding of disc records in which the gap for escape of air is defined precisely and without difficulty, while reducing the formation of flash at the edge of the disc.

The invention thus envisages apparatus for the injection moulding of record discs, said apparatus comprising two half moulds, two matrices in the shape of a plate bearing the impression of the recording on one of their faces and intended to be applied by their other face against an inner face of each half mould, and a clamping device comprising two sleeves fixed immovably each to one of the half moulds and each having an inner flange, while the two inner flanges are interposed between the outer peripheral zones of the matrices to fix the dies to their respective half moulds, the clamping device also having means of controlling the thickness of a moulding cavity between the matrices, while the moulding apparatus has means for defining between the peripheral zones of the matrices an annular gap for evacuation of air.

In accordance with one aspect of the invention, the apparatus is characterised in that the flange of the first of the sleeves has an annular blade which extends into the moulding cavity, situated radially inside the other flange and which is terminated by a moulding surface defining the radial extent of the cavity, and in that the means of controlling the thickness are interposed between the peripheral zones of the matrices in order to determine between the matrices facing the blade a distance equal to the thickness of the blade plus the width of the annular gap.

Thus, the annular gap is determined with precision in relation to the thickness of the blade so that it is the set of sleeves itself which determines the width of the annular gap independently of the matrices. One set of sleeves is thus sufficient regardless of the manufacturing tolerances on the matrices.

As the means of setting the thickness cooperate with flat peripheral areas of the matrices, the matrices may make, in the course of moulding, movements of thermal or other origin without being hindered by the means of setting and without the definition of the annular gap being affected.

In accordance with the present state of the art, the edge of the disc had a shape which resulted from the cessation of flow of the plastics material in the annular gap at the end of an injection cycle. Such a shape was difficult to control. On the other hand, in accordance with the invention the edge of the disc is moulded by the moulding surface borne by the blade. In addition, the annular gap is not preceded by a funnel-shaped profile, and it has been found that the peripheral flash disappears almost completely.

An embodiment of the invention will now be described, by way of example, with reference to the accompanying drawings in which:

FIG. 3 is a partial view in cross section of the first sleeve of the apparatus in FIG. 1;

FIG. 4 is a partial view in cross section of the second sleeve of the apparatus in FIG. 1;

FIG. 5 is a view on a larger scale of detail V in FIG. 2;

FIG. 6 is a view of detail VI in FIG. 5 at the end of moulding;

The moulding apparatus illustrated in the figures is intended to injection mould microgroove discs 17 cm in diameter.

Figure 1:
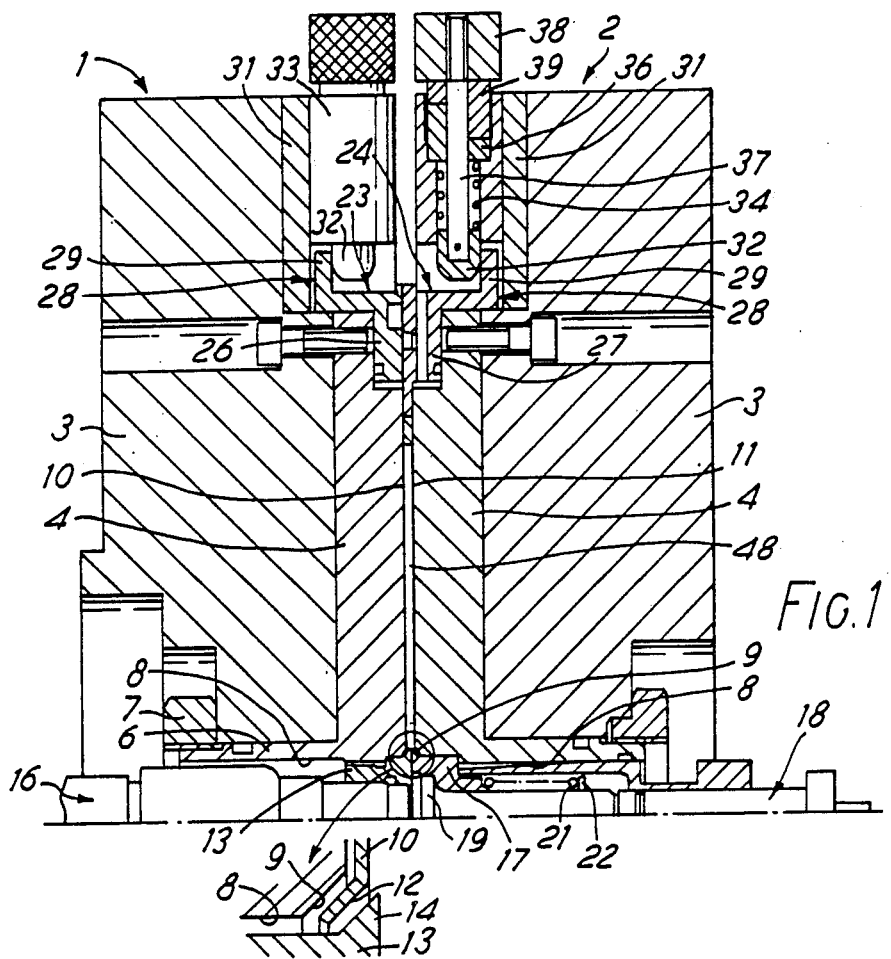
FIG. 1 is a half view in axial cross section of a moulding apparatus in accordance with the invention showing, in outline only, an axially directed injector nozzle.

The apparatus (FIG. 1) comprises two half moulds 1 and 2 each comprising a mould block 3 of generally cylindrical shape and a circular matrix-holding plate 4 fixed rigidly in a central position on basic face of the mould block 3. Each mould block has an axial bore in which is engaged a bush 6 fixed at one end to the associated plate 4 and whose opposite end engages a fixing nut 7.

A bore 8 passes axially through each plate 4 and the associated bush 6. The inwardly facing opening of each bore 8 is widened out by an annular chamfer 9.

The moulding apparatus includes two matrices 10, 11 composed of nickel discs each bearing the negative form of the microgroove modulation to be impressed on its associated record side.

Each matrix is attached to its associated matrix holding plate 4 such that the two matrices are parallel, with their modulated surfaces facing one another.

Each matrix 10, 11 has a central orifice surrounded by a conically dished region 12 and rests against the chamfer 9 of the associated plate 4.

A ring 13 having an enlarged conical region 14 at one end is screwed into the bore 8 of the half-mould 1 such that the dished region 12 of the matrix 10 is supported between the chamfer 9 and the conical region 14.

A plastics injector 16 is mounted in known manner through the bore 8 and the ring 13 of the half mould 1. In the bore 8 of the half mould 2 is mounted with a sliding fit a ring 17 having, like the ring 13, a conical widening out for fixing the other matrix 11 centrally to the half mould 2.

In a known manner the ring 17 forms part of an ejector 18 having a plunger 19 to eject a moulded disc record after cooling of the plastics material and mutual separation of the half moulds 1 and 2. The plunger 19 is brought back against a stop towards the exterior of the mould against an internal shoulder of the ring 17 by means of a compression spring 21 bearing against the ring 17 and against a stop flange 22 fitted to the plunger behind the ring 17.

Each matrix 10, 11 is in addition fixed to its associated half mould 1 or 2 by a first sleeve 23 and a second sleeve 24 respectively. Each sleeve 23 or 24 has a body 26 or 27 respectively occupying a stepped recess, of rectangular profile, which the associated plate 4 has on its periphery. To the outer edge of each sleeve body 26 or 27 is connected a fixing wing 28. Starting from the sleeve bodies 26, 27 the wings 28 extend at first axially away from one another against an outer cylindrical face of the plates 4, then are bent at 90° outwards to each form an outer flange 29.

Each glange 29 is engaged against a fixing ring 31 fixed to its associated half-mould 1 or 2 around the associated plate 4 and a series of locking pins 32 distributed in angular fashion on the ring 31 are directed radially towards the centre of the device. The pins 32 are mounted to slide according to their radial direction in bosses 33 rigidly fixed to the ring 31 and situated radially outside the external flange 29. Each pin 32 is loaded radially inwards by a compression spring 34 but may be outwardly retracted by hand to allow the sleeves 23 or 24 to be fitted. The spring is preferably supported on the one hand against the pin 32 and on the other against a nut 36 traversed in sliding fashion by a rod 37 fixed by one end to the pin 32 and by the other to a rotating knob 38 near to which is a ring 39. The ring 39 and the nut 36 have mutual bearing surfaces which are stepped in complementary fashion in a circumferential direction.

By the combined rotation of the knob 38 and movement along the radial direction of the apparatus each pin 32 can be displaced between a locking position (shown in FIG. 1) in which the nut 36 and the ring 39 bear one against the other in complementary fashion, and an unlocked position in which the area of the nut 36 which projects furthest radially outwards bears against the area of the ring 39 which projects furthest inwards.

As FIGS. 2-5 show, the body 26 or 27 of each sleeve 23 or 24 has an internal flange 41 or 42 respectively. The flanges 41, 42 extend between the peripheral rims 43 of the matrices 10, 11. Thus each sleeve 23, 24, fixed by the locking pins 32 to its associated half-mould 1 or 2, in turn fixes the matrix 10 or 11 to the associated half mould 1 or 2 by gripping the peripheral rim 43 of the matrix between the flange 41 or 42 and the associated matrix holding plate 4.

Figure 2:
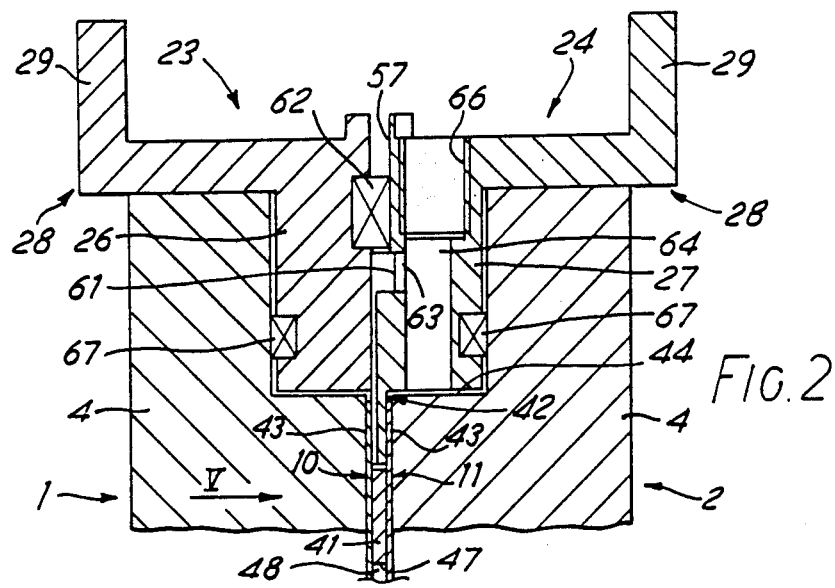
FIG. 2 is a view on a larger scale of the sleeves and matrices in FIG. 1.

The matrices 10, 11, with the exception of their conically dished regions 12 but including their peripheral rim 43, extend entirely in a plane perpendicular to their axis. Their outer edge is practically level with a shoulder 44 forming the internal radial limit of the recess in each plate 4 in which is located the body 26 or 27 of each sleeve 23 or 24 (FIG. 2). To be able to engage between the rims 43 thus shaped each flange 41 or 42 extends substantially in a plane which in service is that of the moulding cavity 48 (FIGS. 2 and 5), that is the space between the matrices 10, 11 intended to be filled by the plastics material during moulding.

More precisely (FIGS. 3, 5, 7 and left hand part of FIG. 9), the flange 41 has an annular blade 46 of substantially rectangular profile (FIG. 3) terminated on the inner radial side by a substantially cylindrical moulding surface 47 which in service defines the periphery of the moulding cavity 48. The thickness e of the blade 46 is equal to the thickness of the disc to be produced less the width J (FIG. 5) of a gap made at the periphery of the space 48 to allow air to escape during the injection of the plastics. For example, if the disc to be produced is 0.9 mm thick the distance between the two faces directed towards one another of the dies 10 and 11 is obviously 0.9 mm and e is chosen equal to 0.87 mm and J equal to 0.03 mm.

Figure 7:
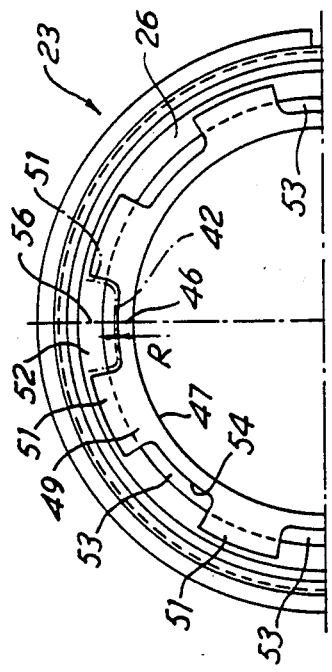
FIG. 7 is a half front view of the first sleeve.
Figure 9:
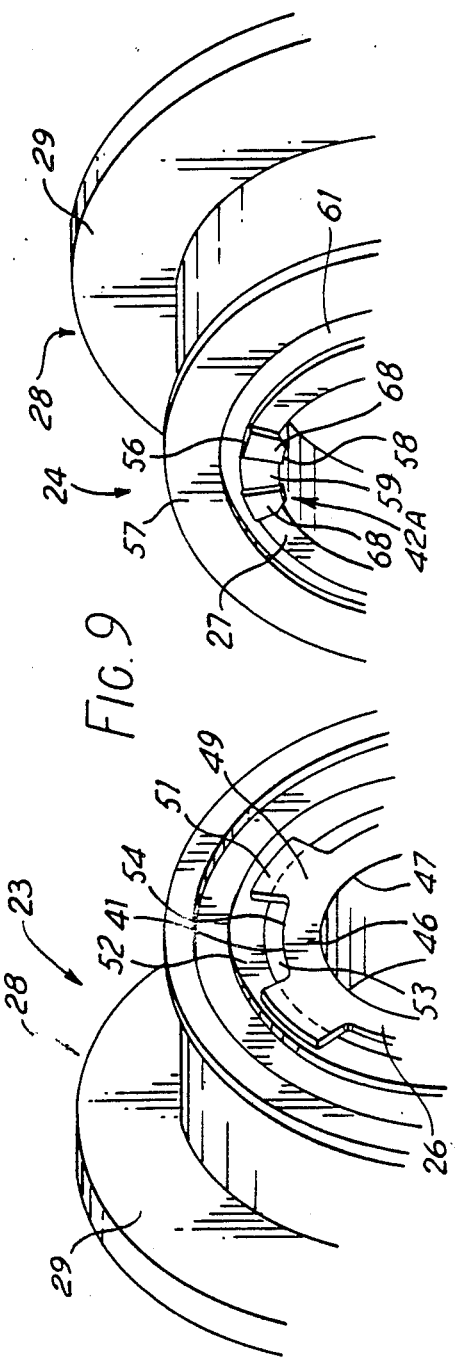
FIG. 9 is a partial perspective view showing the two sleeves one facing the other and engaged.

As is shown in FIG. 7 and the left hand side of FIG. 9, the blade 46 is attached to the body 26 of the sleeve 23 by connecting lugs 49 distributed angularly around the blade. The end regions 51 of the connecting lugs 49 project from the surface 52 of the sleeve 23 to form bosses facing the sleeve 24.

Figure 8:
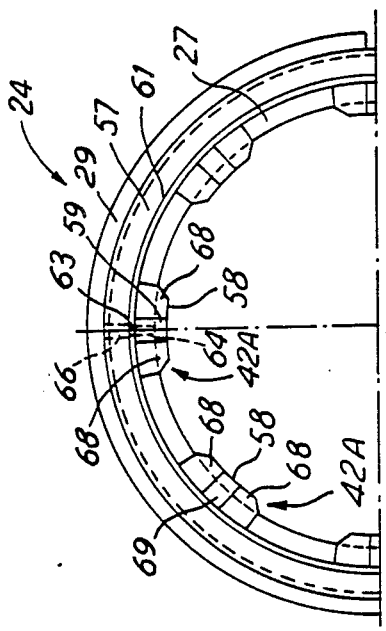
FIG. 8 is a half front view of the second sleeve.

Between the connecting lugs 49, the blade 46 is separated from the body 26 by apertures 53 which in service are disposed partly between the rims 43 of the matrices 10 and 11. In the example shown there are eight connecting lugs 49 each covering 21° of angle and eight apertures 53 each covering 24° of angle. The connecting lugs 49 are of the same thickness, and are in the same plane as, the blade 46. The flange 42 is composed of individual lugs 42a angularly distributed on the sleeve 24 and which are borne by bosses 56 projecting on a face 57 presented by the sleeve 24 facing the sleeve 23, as is shown in FIGS. 4, 5, 8 and the right hand side of FIG. 9.

The individual lugs 42a have the same angular distribution as the apertures 53 of the flange 41 and have a contour which allows them to fit into these latter, while the bosses 56 are located between the bosses 51 of the sleeve 23. In FIG. 7 there is shown, as a dot-dash line, an individual lug 42a and a boss 56 between two connecting lugs 49 of the sleeve 23.

The individual lugs 42a and the blade 46 are dimensioned such that, when fitted together, there is a radial gap R between the outer edge 54 of the blade and the inner edge 58 of each individual lug 42a. The gap R communicates on the side of matrix 11 directly with the gap J and communicates on the side of the matrix 10 with passage 59 passing radially right through each individual lug 42 and the associated boss 56.

In the example shown the passages 59 are formed by radially directed slots in the individual lugs 42a and the bosses 56 and are thus adjacent to the matrix 10. At the outer radial extremity, the passages 59 open into an annular groove 61 in the body 27 radially outside the bosses 56, opposite an area of the body 26 situates radially outside the bosses 51. Beyond this area, the body 26 has an O ring seal 62 (FIG. 2) intended to be supported against the face 57 of the body 27 radially outside the groove 61.

The groove 61 communicates via ducts 63, 64 made in the body 27 with a threaded orifice 66 in the body 27 on its radially outer face for connecting a source of suction.

Each body 26, 27 also bears on its face opposite to the other body 27 or 26 a seal 67 cooperating with the associated plate 4.

On either side of the passage 59 each individual lug 42a constitutes a thickness shim 68 and to this end presents in an axial direction a thickness exactly equal to the thickness of the disc to be produced, that is 0.9 mm in the example considered above. It is by the pressure of the matrices 10, 11 on either side of these shims 68 that on the one hand the thickness of the disc and on the other the value of the annular gap J adjacent to the blade 46 are determined. The blade 46 presents to the matrix 10 a flat clamping face 71 by which it presses the matrix 10 against the associated plate 4 and the gap J is necessarily adjacent to the matrix 11.

To mould a disc, the pins 32 on each half-mould are put in the retracted position using the knobs 38. The rings 13 and 17 are removed and the matrices 10 and 11 are placed against the inner faces of the plates 4. The rings 13 and 17 are then re-fitted and the sleeves 23 and 24 are put in place on the respective half moulds 1 and 2. The knobs 38 are then maneuvered to permit the pins 32 to return to the locking position and the two half moulds 1 and 2 are brought together. The thickness shims 68 which are at least in part interposed between the matrices 10 and 11 determine the thickness of the product to be made and the width of the gap J for evacuation of the air. A source of suction such as a vacuum pump is connected to the threaded orifice 66, which, due to the seals 62 and 67 tends to empty of air the moulding cavity 48 via the gap J, the gap R between the edges 54 and 58 of the blade 46 and the individual lugs 42a respectively, and via the passages 59, the groove 61 and the ducts 63, 64.

At the same time as or shortly after, so connecting the source of suction, the plastic is injected using the injector 16. The plastic spreads radially while the air escapes. The injection is programmed so as to stop when a sufficient quantity of material has been injected. At that moment (FIG. 6) the material just reaches the moulding surface 47 of the blade 46 and the annular entrance of the gap J. As this entrance corresponds to a sudden reduction in cross section for the flow of the plastics material, the flow is severely restricted and in practice practically no flash is formed. In contrast, in apparatus used hitherto, the gap J was formed directly between the two matrices 10 and 11 and led to divergent conical surfaces, favouring the formation of flash.

In the invention, the width of the gap J is determined by the difference in thickness between the shims 68 and the blade 46, and it is thus independent of the matrices 10 and 11, the making of which is moreover simplified since apart from the conically dished region 12 they are entirely flat.

The discs produced with the device covered by the invention are of very consistent quality due to the precision and reliability of the regulation of the gap J. In addition, their peripheral edge has a geometric shape substantially free from flash giving a good appearance to the product and not cutting the sleeves in which these discs are kept.

The invention is not limited to the example described and illustrated, and numerous variations may be added to this example without going beyond the scope of the invention.

Thus, for example, the means of setting could be composed of bosses borne by the blade near its radially outer edge, in which case the outer flange would have the sole function of fixing the associated matrix to the second half mould.

What we claim is:

1. Apparatus for the injection moulding of disc records, said apparatus including a first half-mould associated with a first matrix and a first fixing sleeve, and a second half-mould associated with a second matrix and a second fixing sleeve, each matrix being clamped to its associated half-mould by means of its associated fixing sleeve such that a substantially disc-shaped moulding cavity having a circular periphery is formed between facing surfaces of the first and second matrices, an annular air passage being provided adjacent to the periphery of the disc-shaped moulding cavity for permitting escape of air from the moulding cavity during a moulding operation, means releasably mounting said first and second fixing sleeves around said first and second half-moulds respectively, said first and second fixing sleeves being provided with first and second flanges respectively, said flanges extending inwardly into a peripheral annular space between the matrices, the first and second flanges supporting the first and second matrices against the first and second half-moulds respectively, the first flange being provided with an inner annular blade, the annular blade having a substantially constant thickness and an inner edge defining a moulding surface at the periphery of the disc shaped moulding cavity, the annular blade lying radially within the second flange, one or more portions of either the first or the second flange having a thickness which is greater than the thickness of the annular blade, said one or more portions lying in an annulus situated radially outside the inner edge of the annular blade such that the disc shaped moulding cavity has a width which is substantially defined by the thickness of said one or more portions and the annular air passage has a width which is substantially defined by the difference between the thickness of said one or more portions and the thickness of the annular blade.

2. Apparatus according to claim 1 wherein the facing surfaces of respective matrices each bear modulation, said modulation representing a recording.

3. Apparatus according to claim 1 wherein the annular air passage presents an abrupt reduction in cross-section such that flash formation is substantially eliminated.

4. Apparatus according to claim 3 wherein the disc shaped moulding cavity is substantially cylindrical.

5. Apparatus according to claim 1 wherein the portion or portions of greater thickness are directly interposed between the matrices and are adjacent to a radially outer extremity of the blade.

6. Apparatus according to claim 5 wherein the annular blade is joined to said first fixing sleeve by means of a plurality of radially outwardly extending connecting lugs having spaces between adjacent connecting lugs and wherein the portions having a greater thickness comprise a plurality of individual lugs extending radially inwards of the second fixing sleeve, said individual lugs forming at least a part of the second flange and being positioned such that, in operation, the individual lugs lie in the spaces between the connecting lugs around the periphery of the annular blade.

7. Apparatus according to claim 6 wherein the individual lugs are provided with air outlet passages which communicate with the annular air passage and are connectable to a source of suction.

8. Apparatus according to claim 7 wherein the air outlet passages comprise substantially radially directed slots in said individual lugs.

9. Apparatus according to claim 7 wherein the air outlet passages are radially linked to an annular collection groove in one of said fixing fleeves, the groove being linked by a passageway to the source of suction, and a first air seal is provided between the sleeves in an annulus surrounding the collection groove.

10. Apparatus according to claim 9 wherein a second air seal is provided between the first sleeve and the first half-mould and a third air seal is provided between the second fixing sleeve and the second half-mould.

* * * * *